United States Patent [19]
Gobert

[11] Patent Number: 5,425,239
[45] Date of Patent: Jun. 20, 1995

[54] SUPERCHARGED INTERNAL COMBUSTION ENGINE WITH EGR

[75] Inventor: Ulrich Gobert, Hisings Kärra, Sweden

[73] Assignee: AB Volvo, Gothenburg, Sweden

[21] Appl. No.: 218,376

[22] Filed: Mar. 28, 1994

[30] Foreign Application Priority Data

Apr. 1, 1993 [SE] Sweden .................. 9301093

[51] Int. Cl.[6] ................................ F02M 25/07
[52] U.S. Cl. .................................. 60/605.2
[58] Field of Search .............. 60/605.2, 609

[56] References Cited

U.S. PATENT DOCUMENTS

| | | | |
|---|---|---|---|
| 3,149,454 | 9/1964 | Hahn | 60/605.2 |
| 3,996,748 | 12/1976 | Melchior | 60/605.2 |
| 4,426,848 | 1/1984 | Stachowicz | 60/605.2 |
| 4,903,488 | 2/1990 | Shibata | 60/609 |

FOREIGN PATENT DOCUMENTS

| | | | |
|---|---|---|---|
| 4-47157 | 2/1992 | Japan | 60/605.2 |
| 422861 | 4/1974 | U.S.S.R. | 60/605.2 |

*Primary Examiner*—Michael Koczo
*Attorney, Agent, or Firm*—Young & Thompson

[57] ABSTRACT

A supercharged internal combustion engine with an exhaust driven turbo compressor (4,5) and a mechanically driven compressor (11), the pressure side of which is connected to the suction side of the turbo compressor. A conduit (18) for recirculation of exhaust opens into an ejector device (23,24) in a bypass conduit (17a, 17b), which branches downstream of the turbo compressor from an intake conduit (15) provided with a damper (16).

8 Claims, 1 Drawing Sheet

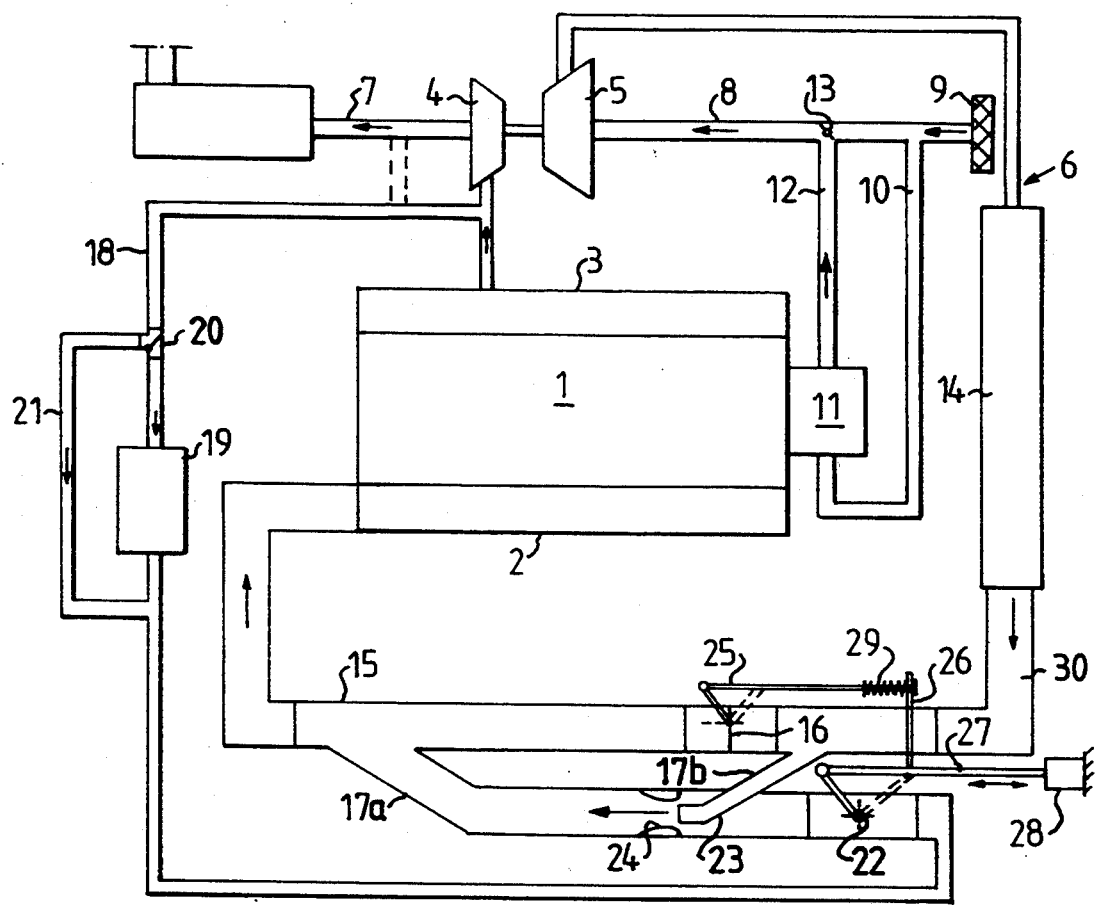

SUPERCHARGED INTERNAL COMBUSTION ENGINE WITH EGR

The present invention relates to a supercharged internal combustion engine, comprising a charging device in the form of an exhaust driven turbo compressor and a mechanically driven compressor.

It is a known fact that a turbocharged diesel engine with high mean pressure always has the disadvantage that its low rpm torque is low. In order to obtain high power, the turbo unit must be optimized towards high charge pressure in the high rpm range, which has the result that the charge pressure will be relatively low in the lower rpm range, since the available exhaust energy within this range is often insufficient to drive the turbo unit.

It is known from SE-A-467269 in marine applications to compensate the relatively poor charge pressure of a turbo compressor at low rpms with a mechanically driven compressor which is coupled in series with the turbo compressor, so that the pressure side of the mechanical compressor is coupled to the suction side of the turbo compressor. This produces a charge pressure on the pressure side of the turbo compressor, which is the product of the charge pressure ratio of the compressors. This solution makes it possible to optimize the charge pressure with simple means for both the high rpm range and the low and medium rpm ranges to thus provide a supercharged diesel engine which is particularly suitable for heavy planing boats and which provides high proportion even in the lower rpm range, within which the boat is to pass its planing threshold.

In the boat motors of the type in question, up to now the problem has not been solved of recirculating exhaust at low load primarily in order to reduce NOX emissions.

The purpose of the present invention is to develop a supercharged internal combustion engine of the type described by way of introduction which makes possible recirculation of exhaust to reduce NOX emissions during operating conditions, when the intake air pressure in the intake manifold is higher than the exhaust pressure.

This is achieved according to the invention by virtue of the fact that a conduit for recirculation of exhaust from the exhaust side of the engine to its intake side opens into an ejector device disposed in an intake air conduit, a conduit from the pressure side of the charging device leading to said ejector device. Exhaust gases can be introduced into the engine intake system in essentially two different ways which have different advantages and disadvantages, namely either to the intake side of the intake system, i.e. before the charging device, or to its pressure side, i.e. after the charging device. Technically, the simplest method is to connect the recirculation conduit to the suction side of the mechanical compressor, but in that case the exhaust gases would pass both compressors and a charge air cooler which is often placed thereafter. A substantial disadvantage is, however, that all of the components would with time be coated with harmful layers of soot from the exhaust. This disadvantage can be avoid by inducing the exhaust downstream of said components, i.e. in the pressurized portion of the intake system, which according to the invention is achieved by using an ejector device.

The invention will be described in more detail with reference to examples shown in the accompanying drawing, where the FIGURE shows schematically a diesel engine with a coupling diagram of its compressor connection and the recirculation system of exhaust.

In the FIGURE, 1 designates a internal combustion engine of diesel type, 2 designates an intake manifold and 3 an exhaust pipe. A turbo compressor consisting of a turbine portion 4 and a compressor portion 5 is coupled to an intake conduit 6 and an exhaust conduit 7. The intake conduit 6 comprises a conduit 8 between an intake air filter 9 and the suction side of the turbo compressor portion 5. From the intake conduit, a conduit 10 diverges to the suction side of the mechanically driven compressor 11, the pressure side of which compressor is connected to a conduit 12, which opens into the conduit 8. The compressor can be of any known type whatsoever, but is preferably of the displacement type, for example a screw compressor. In the conduit 8 there is a damper 13, which in the position shown conducts intake air into the turbo compressor 5 via the mechanical compressor 11. When the turbo compressor 5 demands more air on the suction side than what the mechanical compressor 11 is able to deliver, the damper 13 is in a position in which the turbo compressor 5 can suck air directly via the air filter 9. In this situation, the mechanical compressor 11 can be shut off, for example with the aid of a magnetic switch. The damper can be replaced by a non-return valve arrangement, which automatically bypasses the mechanical compressor.

The conduit 6 on the pressure side of the turbo compressor opens into a charge air cooler 14, from which a conduit 15 leads to the intake manifold 2. In the conduit 15 a damper 16 is arranged. An intake air conduit 17a and a conduit 17b diverge from the conduit 15 past the section containing the damper 16, so that the intake air when the damper 16 is closed can reach the intake manifold 2 via the conduits 17a and 17b.

From the exhaust conduit 7 upstream (alternatively downstream) of the turbo compressor turbine 4, there diverges an exhaust conduit 18 for recirculation of a portion of the exhaust to the engine intake side, specifically to the conduit 17a. In the exhaust conduit 18 there is a cooler 19, a damper 20 and a bypass conduit 21 in order to provide, depending on the engine operating state, recirculation of hot or cold exhaust to the bypass conduit 17.

The exhaust conduit 18 leads via a damper 22 to an ejector device which is formed of an end portion 23 of the conduit 17b and a nozzle 24 arranged in the conduit 17a and which surrounds the end portion 23. The damper 16 is coupled via a rod 25 and an arm 26 to an operating rod 27 joined to the damper 22. The operating rod 27 is in turn connected to an electrically, pneumatically and/or hydraulically driven control means 28 for displacing the rod 27 in its longitudinal direction thereby moving the dampers 16, 22 between their open and closed positions. The dampers 16,22 are in this case coupled together in such a manner that the damper 22 in the exhaust 18 is opened, when the damper 16 in the intake conduit 16 is closed as is indicated by the solid lines in the FIGURE. The pressure difference created by the ejector device 23, 24 between the exhaust pressure in the exhaust conduit 18 and the pressure in the intake conduit 17 downstream of the tube 23 makes it possible to direct such exhaust into the intake pipe 2 even when the air pressure in the intake system is higher than the pressure on the exhaust side.

When the engine load and rpm is within a range where exhaust recirculation is no longer needed, the control device 28 is activated, and the dampers 16, 22 are moved to their respective positions shown with dashed lines.

The rod 25 of the damper 16 is coupled to the arm 26, so that it is displaceable relative to the arm 26 against the force of a spring 29. The damper 16 is also asymmetrically mounted, which means that when there is a certain pressure on the upstream side of the damper, the damper 16 will open to a certain degree under the force generated by the pressure, which acts against the force of the spring 29. In this manner, the damper 16 also functions as a relief valve, which automatically opens when the charge pressure at 30 on the intake side reaches a predetermined value.

I claim:

1. A supercharged internal combustion engine, comprising a charging device in the form of an exhaust driven turbo compressor and a compressor mechanically driven by the engine, a conduit (18) for recirculation of exhaust from an exhaust side of the engine to an intake side of the engine, said conduit (18) opening into an ejector device (23, 24) disposed in an intake air conduit (17a) of the engine, a conduit (17b) from a pressure side of the charging device (5, 11) leading to said ejector device (23, 24).

2. An internal combustion engine according to claim 1, wherein the conduit (17a) with the ejector device (23, 24) and the conduit (17b) from the pressure side of the charging device (5, 11) open into a main intake conduit (15) of the engine upstream of the engine intake manifold (2).

3. An internal combustion engine according to claim 2, wherein a first damper (22) for shutting off recirculation of exhaust to said intake side is arranged in said recirculation conduit (18) and a second damper (16) is arranged in the main intake conduit (15) downstream of the conduit (17b) from the pressure side of the charging device (5, 11), for shutting off the main conduit (15) and conducting intake air through the two first-mentioned conduits (17a, 17b), when the first damper (22) is open.

4. An internal combustion engine according to claim 3, wherein the first and second dampers (22, 16) are interconnected with a common operating device (27, 28) so that one damper is closed when the other is opened.

5. An internal combustion engine according to claim 4, wherein the second damper (16) is so resiliently connected to an operating device (27, 28) common to the two dampers, that it serves as a relief valve.

6. An internal combustion engine according to claim 2, wherein the ejector device is formed of a nozzle (24) and, located in the nozzle, an end portion of the conduit (17b) leading from the pressure side of the charging device (5, 11).

7. An internal combustion engine according to claim 2, wherein the two first-mentioned conduits (17a, 17b) are connected to the intake conduit (16) downstream of a charge air cooler (14).

8. An internal combustion engine according to claim 1, wherein a pressure side of the mechanical compressor (11) is connected to a suction side of the turbo compressor (5).

* * * * *